Figure 1:
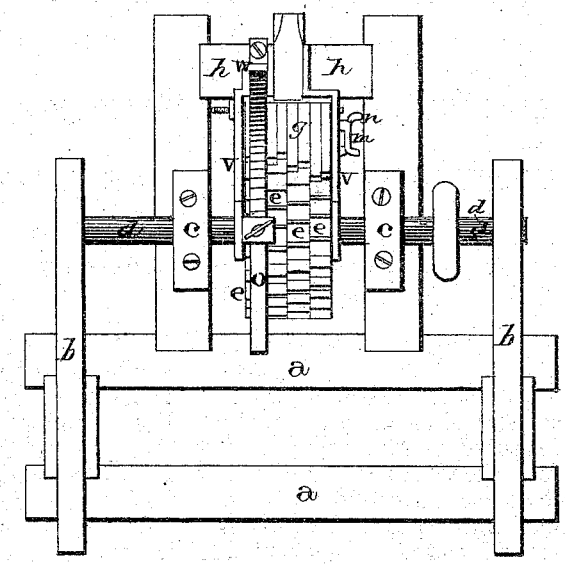
Figure 2:
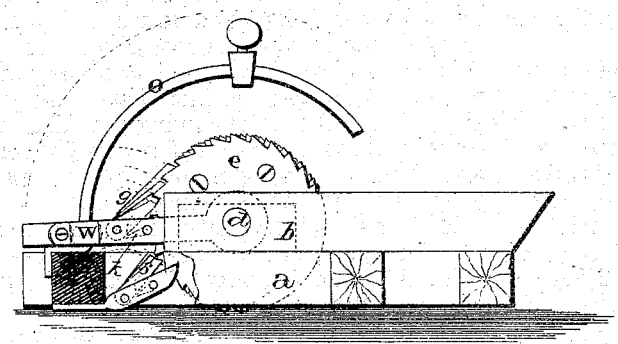
Figure 3:
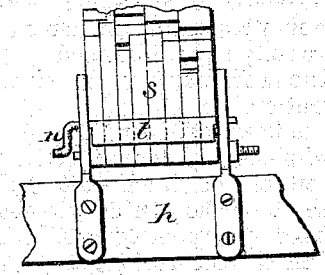

J. R. JACKSON.
Head Blocks for Saw-Mills.

No. 158,496.  Patented Jan. 5, 1875.

WITNESSES:
J. Wm. Garner,
Frank Claudy

INVENTOR.
Jno. R. Jackson
her
F. A. Lehmann, Atty.

UNITED STATES PATENT OFFICE.

JOHN R. JACKSON, OF PUTNAMVILLE, INDIANA.

IMPROVEMENT IN HEAD-BLOCKS FOR SAW-MILLS.

Specification forming part of Letters Patent No. 158,496, dated January 5, 1875; application filed September 5, 1874.

*To all whom it may concern:*

Be it known that I, JOHN R. JACKSON, of Putnamville, in the county of Putnam and State of Indiana, have invented certain new and useful Improvements in Head-Blocks for Saw-Mills; and I do hereby declare the following to be a full, clear, and exact description of the invention, such as will enable others skilled in the art to which it pertains to make and use it, reference being had to the accompanying drawings, which form part of this specification.

My invention relates to an improvement in head-blocks for saw-mills; and consists in the combination and arrangement of parts herein more fully to be described.

The accompanying drawings represent my invention.

a indicates the carriage, on which rests the head-block b. Journaled in the head-block on either side, and resting also in journal-boxes c on the carriage, is shaft d, on which is fixed the ratchet-wheels e, said wheels being firmly secured together, and of any required number. The teeth in the different wheels are set in a certain definite relation to each other; but the teeth in no two wheels are in a line with each other. Swinging on shaft d is the frame v, in which are pivoted the dogs g, said dogs being of unequal length, but arranged with reference to the teeth in the ratchet-wheel, so that, upon the slightest forward movement of the dog-frame, the dogs will engage with the ratchet-teeth. Below the series of dogs, and swinging on a rod in the frame attached to cross-beam h, is a series of pawls, s, similar in shape and relative length to the dogs, and arranged to engage the ratchet-wheel. Slightly in advance of the rod on which are pivoted the dogs is a swinging lever, k, for disengaging the dogs from the ratchet-wheel, and underneath the pawls s is a similar lever, t. These levers are operated by cranks m and n. Fastened to the beam h, and passing through slide w in the frame for the dogs, is the curved gage o, which limits the forward movement of the dogs, gages the thickness of the timber to be sawed, and guides the dog-frame.

By setting the ratchet-teeth as I have described a finer relative adjustment of dogs and teeth is made, thus allowing the use of a smaller number of dogs, which, consequently, may be larger and stronger than those generally used. The ratchet-wheel is also more solid by being composed of several wheels, is less liable to be broken, and can be repaired more easily and at less expense.

Having thus described my invention, I claim and desire to secure by Letters Patent—

Ratchet-wheel e, dogs g, frame v, gage o, pawls s, and the two levers t and k, all arranged and combined as and for the purpose described.

In testimony that I claim the foregoing I have hereunto set my hand this 25th day of May, 1874.

JOHN R. JACKSON.

Witnesses:
JOHN M. HENDIG,
JOHN HAMAKER.